United States Patent [19]
Johannes

[11] 3,875,309

[45] Apr. 1, 1975

[54] DRY MIX FOR FROSTED BROWNIES

[75] Inventor: James H. Johannes, Minneapolis, Minn.

[73] Assignee: General Mills, Inc., Minneapolis, Minn.

[22] Filed: Dec. 3, 1973

[21] Appl. No.: 420,820

[52] U.S. Cl. .................................. 426/152, 426/343
[51] Int. Cl. ............................................. A21d 13/00
[58] Field of Search ............ 426/156, 152, 155, 343

[56] References Cited
UNITED STATES PATENTS

| | | | |
|---|---|---|---|
| 3,037,864 | 6/1962 | Bedenk | 426/152 |
| 3,161,524 | 12/1964 | Opie et al. | 426/156 |
| 3,366,487 | 1/1968 | Hughes et al. | 426/152 |

*Primary Examiner*—Raymond N. Jones
*Attorney, Agent, or Firm*—Gene O. Enockson; Elizabeth Tweedy

[57] ABSTRACT

A brownie dry mix which when reconstituted can be baked with a particular reconstituted brownie frosting dry mix to produce a frosted brownie.

4 Claims, No Drawings

DRY MIX FOR FROSTED BROWNIES

This invention relates to a brownie dry mix especially useful with a particular frosting dry mix. More particularly, this invention relates to a brownie dry mix which when reconstituted can be poured over a particular reconstituted frosting dry mix in the bottom of a pan and the combination baked to produce a frosted brownie. The frosting is of the fudgy brownie type.

Heretofore, frosted brownies have been made by first baking a brownie and cooling it at least an hour before frosting. The frosting was made by boiling together butter, corn syrup, and cocoa ingredients. After cooking the frosting was spread on the cooled brownie. When the frosting mixtures, commonly used by first boiling the mixture and then spreading on cooled brownies, were subjected instead to baking with a brownie batter, the result was a runny, tacky frosting. The final product was not acceptable.

It has now been found that a particular brownie frosting dry mix can be reconstituted, placed in the bottom of a baking pan, the particular reconstituting brownie dry mix of this invention can be poured over the raw reconstituted frosting dry mix and the combination baked together. After baking, the baking pan is inverted and the frosted brownies removed. The frosted brownies are ready to serve in ten or fifteen minutes after baking. There is a distinct interface between the frosting layer and the brownie layer. Both components are of excellent eating quality.

The frosting dry mix composition useful for simultaneously baking with the reconstituted brownie dry mix of this invention consists essentially of:

about 68 to 75 percent sucrose by weight of the frosting dry mix composition, about 10 to 16 percent cocoa by weight of the frosting dry mix composition, and about 9 to 13 percent plastic shortening by weight of the dry mix composition.

The sucrose used has a granulation of from 40 to 70 percent through 100 U.S. Screen.

The cocoa used in the frosting dry mix of this invention can be of any commonly used grade, i.e. breakfast cocoa, dutch processed cocoa, low fat cocoa.

The shortening useful in the frosting dry mix is plastic and has a solid fat index of about:

| Temperature, °F. | SFI, % |
| --- | --- |
| 50 | 29–33 |
| 70 | 21–24 |
| 80 | 19–22 |
| 92 | 14–17 |
| 104 | 8–10 |

The shortening may be of animal or vegetable origin. Animal derived shortening such as tallow, lard and rearranged lard are preferred. Ingredients such as additional flavoring, nuts and emulsifiers may be added to the above dry mix as desired. When calculating the percentage dry mix composition, however, these additional ingredients should not be included in the calculation. As an optional ingredient, polyoxyethylene sorbitan stearate or mono and diglycerides in amounts of about 0.8 percent by weight of brownie frosting dry mix improves the dispersibility of the dry mix in water.

The basic dry brownie mix of this invention consists essentially of:

about 45 to 55 percent sucrose by weight of the dry brownie mix composition, about 20 to 22 percent wheat flour by weight of the dry brownie mix composition, said wheat flour having protein level of about 10 to 10.5 percent by weight of the wheat flour, about 12 to 18 percent shortening by weight of the dry mix composition, about 5 to 10 percent cocoa by weight of the dry brownie mix composition, and about 0.5 to 2.5 percent corn or wheat starch by weight of the dry brownie mix composition.

Corn or wheat starch, either non-gelatinized or gelatinized, can be used. The pregelatinized starches preferably are used in the amount of about 0.5 to 1 percent weight of the dry mix composition. The non-gelatinized starch can be used in an amount of about 1.0 to 2.5 percent by weight of the dry mix composition. The starch acts as a viscosity builder. The shortening may be the same type as used in the frosting dry mix. Flavorings, nuts, fruits and the like can be added as desired but should not be included when calculating the composition of the dry mix.

Each of the above dry mixes is prepared by blending the dry ingredients and extruding and blending the shortening into the other ingredients to form a free flowing mixture.

The final consumer can use the above combination of dry mix compositions by reconstituting each, placing the reconstituted frosting mix in the bottom of a baking pan, placing the reconstituted brownie mix on top of the reconstituted frosting mix and baking the combination for a period equivalent to about 30 to 35 minutes at a temperature of about 350°F. The frosting dry mix can be reconstituted with about 25 to 35 grams melted butter (about 9 to 13 percent by weight of the reconstituted frosting) and about 40 to 50 ml. (about 14.5 to 18.5 percent by weight of the reconstituted frosting) of hot tap water per 198 grams (about 70 to 75 percent by weight of the reconstituted frosting) of dry mix. The brownie dry mix can be reconstituted with about 100 to 130 grams of whole eggs (about 16.5 to 21 percent by weight of the brownie reconstituted mix composition) and about 40 to 50 ml. water (about 6.5 to 8.5 percent by weight of the brownie reconstituted mix composition) per 450 grams of the dry mix (about 71.5 to 76.5 percent by weight of the reconstituted mix composition).

Below are illustrations of the preparation and uses of variations in the above dry mixes.

EXAMPLE I

This example illustrates the use of the frosting dry mixes and the brownie dry mix.

The formulation of the frosting dry mix was as follows:

| | Percentage of Dry Mix By Weight |
| --- | --- |
| Sugar | 73.00 |
| Cocoa | 14.00 |
| Shortening* | 13.00 |

*A plastic tallow base shortening containing tallow flakes and rearranged lard in amounts up to about 10% by weight, stabilized with butylhydroxy toluene and butylhydroxy anisol having a SFI of:

| Temperature, °F | SFI, % |
| --- | --- |
| 50 | 29–33 |
| 70 | 21–24 |
| 80 | 19–22 |
| 92 | 14–17 |
| 104 | 8–10 |

In such formulations three different sugars were used as follows:

| Sample 1 | Sucrose, 40 to 60% through a 100 U. S. Screen |
| --- | --- |
| Sample 2 | Confectionery sucrose, 100% through a 100 U. S. Screen |
| Sample 3 | Dextrose corn sugar |

The samples were reconstituted in 30 grams of butter and 45 ml. of hot tap water per 198 grams of the dry mix. The reconstituted mixes were placed in baking pans and a reconstituted brownie mix having the formulation of:

| | Percentage of Dry Mix By Weight |
| --- | --- |
| Sucrose (40 to 60% through 100 U. S. Screen) | 54.40 |
| Wheat Flour (10.5% protein) | 21.45 |
| Shortening* | 15.35 |
| Cocoa (10 to 12% fat) | 7.15 |
| Pregelatinized corn starch | 0.95 |
| Salt | 0.70 |

*Same as used in the frosting dry mix and reconstituted with 100 grams of whole eggs and 45 ml. of water per 453 grams of the dry mix was placed on top of the frosting. The combination was baked 33 minutes at a temperature of 350°F. The pans were then inverted and the brownie evaluated in 30 minutes.

The results were:
Sample 1 was acceptable as a frosted brownie,
Sample 2 the frosting had a smoother mouth feel than Sample 1,
Sample 3 the frosting was very thick, did not set up and did not spread well.

The brownie portion in each sample was of good eating quality.

EXAMPLE II

This example illustrates the influence of the shortening level in the frosting dry mix.

The following frosting dry mix formulations were evaluated by the procedure set out in Example I:

| Sample | I | II | III |
| --- | --- | --- | --- |
| | Percentage of Dry Mix By Weight | | |
| Sucrose (60% through 100 U. S. Screen) | 71.75 | 69.29 | 66.83 |
| Shortening* | 11.05 | 13.51 | 15.97 |
| Cocoa | 17.20 | 17.30 | 17.19 |
| Beatreme E (marketed by Beatrice Foods Co., dried, 62% mono and diglycerides with added shortening, nonfat milk solids and starch | 0.80 | 0.80 | 0.80 |

*Same as in Example I

The results were:
Sample I the frosting was firm and dry,
Sample II the frosting was more moist and softer, and
Sample III the frosting was preferred.

The brownie portion in each sample was of good eating quality.

EXAMPLE III

This example illustrates the use of starch in the brownie dry mix formulation.

In the brownie mix shown in Example I, the starch was omitted to produce a control. Starch was then included in the following amounts by combining the amount of starch shown below with enough of the control mix to produce a total weight of 453 grams.

The brownie dry mix was then evaluated by the procedure of Example I. The results are shown below:

| Sample | Type of Starch | % by Wt. of Dry Mix | Result |
| --- | --- | --- | --- |
| 1 | — | 0 | Weak along edge and stuck to tray |
| 2 | Pregelatinized corn starch | 0.45 | Acceptable; slightly weak along edges |
| 3 | " | 0.95 | Good |
| 4 | " | 1.45 | Dry |
| 5 | Ungelatinized wheat starch | 1.0 | Good |
| 6 | " | 2.0 | Good |
| 7 | " | 3.0 | Dry |

The embodiments of the invention in which an exclusive property or privilege is claimed are defined as follows:

1. A brownie dry mix consisting essentially of:
   about 45 to 55 percent sucrose by weight of the brownie dry mix composition,
   about 20 to 22 percent wheat flour by weight of the brownie dry mix composition, said wheat flour having a protein level of about 10 to 10.5 percent by weight of the wheat flour,
   about 12 to 18 percent shortening by weight of the brownie dry mix composition, said shortening having a solid fat index of about:

| Temperature, °F. | SFI, % |
| --- | --- |
| 50 | 29–33 |
| 70 | 21–24 |
| 80 | 19–22 |
| 92 | 14–17 |
| 104 | 8–10 | about 5 to 10 percent cocoa by weight of the brownie dry mix composition, and
about 0.5 to 2.5 percent starch by weight of the brownie dry mix composition, said starch being selected from corn and wheat starch.

2. The brownie dry mix of claim 1 wherein the starch is non-gelatinized and is present in an amount of about 1.0 to 2.5 percent by weight of the brownie dry mix composition.

3. The brownie dry mix of claim 1 wherein the starch is gelatinized and is present in an amount of about 0.5 to 1.0 percent by weight of the brownie dry mix composition.

4. A two package dry mix for preparing frosted brownies consisting of:
   a. a brownie dry mix consisting essentially of:
      1. about 45 to 55 percent sucrose by weight of the brownie dry mix composition,
      2. about 20 to 22 percent wheat flour by weight of the brownie dry mix composition, said wheat flour having a protein level of about 10 to 10.5 percent by weight of the wheat flour,
      3. about 12 to 18 percent shortening by weight of the brownie dry mix composition, said shortening having a solid fat index of about

| Temperature, °F. | SFI, % |
|---|---|
| 50 | 29–33 |
| 70 | 21–24 |
| 80 | 19–22 |
| 92 | 14–17 |
| 104 | 8–10 |

4. about 5 to 10 percent cocoa by weight of the brownie dry mix composition, and
   5. about 0.5 to 2.5 percent starch by weight of the brownie dry mix composition, said starch being selected from corn and wheat starch; and
   b. a dry frosting mix consisting essentially of:
      1. about 68 to 75 percent sucrose by weight of the frosting dry mix composition,
      2. about 10 to 16 percent cocoa by weight of the frosting dry mix compostion, and
      3. about 9 to 13 percent shortening by weight of the frosting dry mix composition, said shortening having a solid fat index as defined in regard to the brownie dry mix composition (a) (3).

* * * * *